Nov. 8, 1927.
F. DI MARZO
TRICYCLE
Filed Aug. 14, 1926
1,648,609
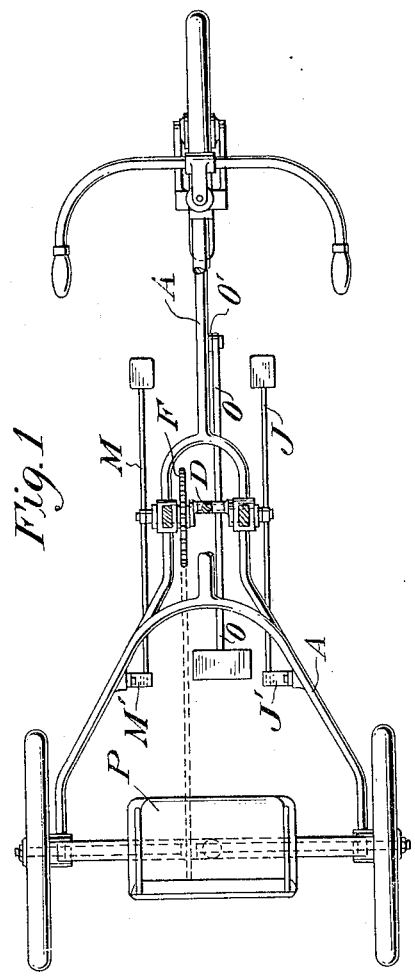
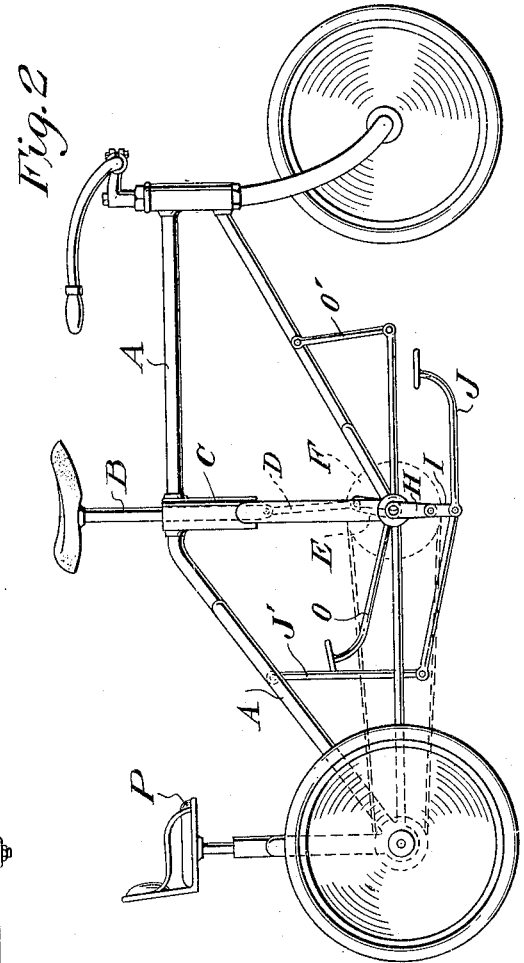
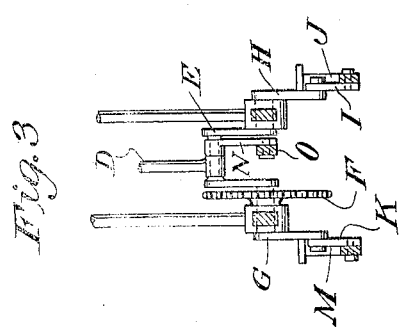
INVENTOR
Francis Di Marzo
By E. M. Bentley
Attorney Patented Nov. 8, 1927.

1,648,609

UNITED STATES PATENT OFFICE.

FRANCIS DI MARZO, OF TUFO, ITALY, ASSIGNOR TO MADDALENA GANNACO, OF LAWRENCE, NEW YORK.

TRICYCLE.

Application filed August 14, 1926. Serial No. 129,133.

For a detailed description of the present form of my invention, reference may be had to the following specification and to the accompanying drawings forming a part thereof, wherein Fig. 1 is a plan view with the seat removed;

Fig. 2 is a side elevation;

Fig. 3 shows the details of the cranks.

My invention relates to a novel mode of operating such a vehicle by the joint effect of the operator's weight applied alternately to the pedals and the seat. While the invention is herein illustrated as embodied in a tricycle, it may also be embodied in a bicycle.

In the drawings A is the vehicle frame which is forked, as usual, for the front steering wheel and also forked at the rear towards the rear axle bearings, while the seat-post is also forked to receive the crank axle and the larger sprocket wheel.

The seat-rod B passes loosely through the sleeve C, which forms the unbranched portion of the seat-post, and is jointed to the outer end of pitman-rod D which acts on the main crank E (Fig. 3).

The two parts of the crank-shaft are journalled in the lower ends of the respective branches of the forked seat-post and are provided respectively with the outside cranks G and H. Two pedal-levers M and J are connected with the respective cranks G and H by the links I and K. The said pedal-levers are supported at their rear ends from the respective branches of the rear frame-fork by the links $J^1$ and $M^1$. By the means thus far described the main crank-shaft is operated, on the one hand, by the weight of the rider exerted through seat-rod B, pitman D and crank E, and, on the other hand, by the weight of the rider, when standing on the pedals, exerted through pedal-levers J and M, links I and K and cranks H and G. Thus by alternately sitting on the seat and standing on the pedals the rider rotates the main crank-shaft and the rotation of the shaft is transmitted in the usual way to the rear axle of the vehicle by sprocket-wheel F and a sprocket-chain.

A second seat P is mounted rigidly on the frame over the center of the rear axle, and a second rider on this seat can assist in the propulsion by standing periodically on the pedal-lever O, which is supported from the front post of the frame by a link $O^1$ and is also connected by link N with the wrist-pin of the aforesaid crank E. Thus the weight of the first rider, acting on crank E by seat-post B and pitman D, is supplemented by the weight of the second rider standing on pedal-lever O.

By means of my device the operation of the vehicle is no longer a sidewise transfer of the pushing impulse from one foot to the other, but is a fore-and-aft transfer from a push with both feet simultaneously on the pedals in front to a push on the seat behind as the rider subsequently seats himself and then lifts his feet as the pedals rise. The second rider makes similar movements but does not exert a propelling impulse as he sits down on the seat.

What I claim as new and desire to secure by Letters Patent is:

1. A bodily-propelled vehicle provided with a vertically movable seat-rod having a crank-and-pitman connection to a crank shaft of the vehicle and also provided with a pedal-lever having a link-and-crank connection to the same crank shaft.

2. A bodily-propelled vehicle having pedal levers extending both forwardly and rearwardly from the seat-rod, a rear-seat adjacent to the rearwardly extending pedal and a crank shaft operated by both levers conjointly.

3. A bodily propelled vehicle provided with a seat post, a vertically movable seat rod guided by said seat post, crank mechanism for propelling the vehicle, and a pitman rod connecting said seat post with said crank mechanism.

4. A bodily propelled vehicle provided with a vertically movable seat rod, a crank shaft having two parts each provided with oppositely extended crank arms, a pitman rod connecting the seat rod with the crank arms which extend in one and the same direction, a movably mounted pedal, and links connecting the pedal with the other crank arms.

5. A bodily propelled vehicle provided with a vertically movable seat rod, a crank shaft for propelling said vehicle, said crank shaft having crank arms, one of said crank arms being connected to said seat rod, and a pedal lever movably supported at one end and connected with another one of the crank arms.

Signed at Naples, Province of Naples, Italy, this 17th day of July 1926.

FRANCIS DI MARZO.